Aug. 22, 1933.  K. WINKLER ET AL  1,923,652
RECOVERY OF MOLYBDENUM
Filed Aug. 27, 1930
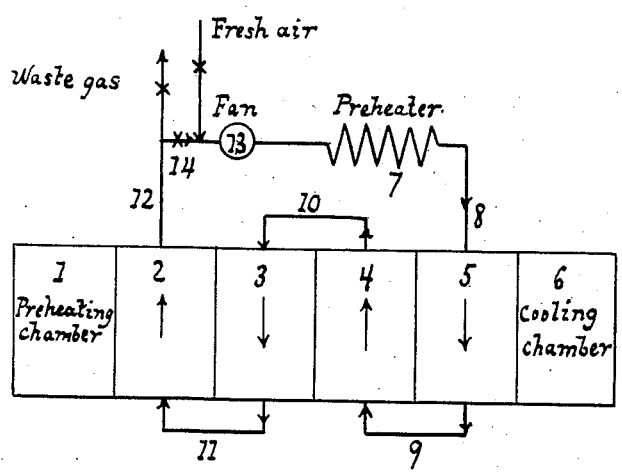
Karl Winkler
Walter Kroenig
INVENTORS
BY ATTORNEYS Patented Aug. 22, 1933

1,923,652

UNITED STATES PATENT OFFICE 1,923,652

RECOVERY OF MOLYBDENUM

Karl Winkler and Walter Kroenig, Ludwigshafen-on-the-Rhine, Germany, assignors to I. G. Farbenindustrie Aktiengesellschaft, Frankfort-on-the-Main, Germany Application August 27, 1930, Serial No. 478,111, and in Germany September 27, 1929

5 Claims. (Cl. 23—24)

The present invention relates to the recovery of molybdenum from mixtures of molybdenum or molybdenum compounds with other metals or metal compounds.

The recovery of molybdenum from mixtures of molybdenum or molybdenum compounds with other metals or metal compounds, in particular the regeneration of catalysts containing molybdenum such as are employed in the destructive hydrogenation of distillable carbonaceous materials such as coals, tars, mineral oils and the like, is of great practical importance and has hitherto only been carried out with considerable losses of molybdenum.

We have now found that molybdenum may be recovered practically completely from the said mixtures, which may contain other metals, as for example chromium, zinc, magnesium and the like in addition to molybdenum, by subjecting the mixtures to a treatment with oxygen or gases containing or supplying oxygen such as air, nitrogen oxides or the like at elevated temperatures not exceeding 600° C. and preferably below 500° C., but usually not below 400° C. The molybdenum is usually recovered in the form of its higher oxides such as molybdic acid, according to the process of the present invention. No formation of compounds between the molybdic acid recovered and the other constituents of the mixture takes place which would injuriously affect the subsequent further working up of the roasted material, when carrying out the recovery in the said manner. The said temperatures are below the usual roasting temperatures of about 600° to 700° C. for the working up of ores containing molybdenum. In order to avoid too great an increase in temperature during the oxidizing treatment, it is preferable to treat the material first with gases poor in oxygen, as for example the waste gases from the treatment if desired with the addition of inert gases such as carbon dioxide, nitrogen or the like, and to increase the oxygen content of the gases gradually so that gases rich in oxygen, as for example atmospheric air, are not used until the end of the treatment. It is advantageous to select a reaction vessel which is subdivided into several chambers so that the oxidizing treatment of the material may be carried out in several fractions and stages, the conditions in each stage being more intensive than in the preceding stage.

The molybdenum oxides thus obtained are then separated from the other substances contained in the resulting mixture. This separation may be carried out in different ways, as for example by treating the roasted material with ammonia and precipitating the molybdenum from the resulting ammoniacal solution at such a hydrogen ion concentration that a complete separation of the molybdic acid from the other constituents takes place. For this purpose the roasted material may be exposed to the action of aqueous ammonia, for example of from 5 to 10 per cent strength, in a continuously working apparatus consisting of several extraction vessels so that the molybdenum passes into solution quantitatively in the form of ammonium molybdate. During the subsequent precipitation of the molybdenum from this ammoniacal solution, which is effected by acidification for example with hydrochloric acid, the maintenance of a definite hydrogen ion concentration is important because if the hydrogen ion concentration is too high part of the molybdic acid readily dissolves again, whereas if the hydrogen ion concentration is too low there is a danger that the precipitate may contain more or less large amounts of the constituents other than molybdenum in the form of molybdates. The optimum value of the hydrogen ion concentration may be readily determined by a preliminary experiment on a small scale.

Another method of working up the roasted material is by treating it with suitable acids, and if necessary with an oxidizing agent, in order to dissolve out the constituents other than molybdenum. For this purpose dilute hydrochloric acid may be used as the acid and nitric acid as the oxidizing agent. The molybdic acid remains practically undissolved and may be readily separated from the resulting solution from which the other constituents of the initial material may be recovered in any known or suitable manner.

When, according to the present invention, it is desired to regenerate catalysts containing molybdenum, especially the catalysts employed in the destructive hydrogenation of carbonaceous materials such as tars, mineral oils, coals and the like in the liquid phase and which, after use, frequently contain considerable amounts of impurities, especially of an organic nature, it is preferable to subject the catalysts to a purification before roasting them. For this purpose, agents which dissolve the impurities or cause them to separate in flocks, the flocks being decanted off, may be mixed with the catalysts, and the mixture centrifuged, a catalyst mass free from impurities being thus obtained which may be directly worked up as hereinbefore described.

The following examples will further illustrate the nature of this invention, but the invention is not restricted to these examples.

Example 1

One metric ton of a catalytic mass of 30 per cent of molybdic acid, 10 per cent of chromium oxide and 60 per cent of oil, which has been taken out from a high-pressure vessel used for the destructive hydrogenation of coals, tars, oils and the like in the liquid phase, is diluted at 100° C. with one metric ton of a middle oil of low boiling point and is centrifuged in a rapidly rotating overflow centrifuge 1 metre in diameter at a speed of 1700 revolutions per minute. The resulting catalyst pulp is again made into a paste with middle oil or heavy benzine and centrifuged again. The resulting catalytic mass is supplied to a drying chamber in which the middle oil or heavy benzine is expelled at a temperature of 350° C. The catalytic mass which no longer contains any oil, is brought in the form of layers about 20 millimetres thick on to plates arranged one above the other on small trucks. The roasting is carried out in a furnace consisting of for example six chambers, which furnace will now be further described with reference to the accompanying diagram, illustrating in plan view the arrangement of the said chambers and the manner of conducting the air therethrough. The furnace consists of six chambers 1, 2, 3, 4, 5 and 6, arranged one behind the other, of which chamber 1 serves for preheating the mass to the roasting temperature. The mass is introduced into the aforesaid chamber 1 by means of the aforesaid small trucks which are subsequently brought into the following chambers, so that the mass is passed through all of said chambers. In the chambers 2, 3, 4 and 5, the catalyst, after having been suitably preheated in chamber 1, is subjected to a careful roasting at from 460° to 480° C.

For this purpose, air preheated in a preheater 7 is introduced into chamber 5 by way of a pipe 8. It is then passed into chamber 4, 3 and 2 by way of pipes 9, 10 and 11, respectively, and finally withdrawn from chamber 2 by way of pipe 12. In this way, the preheated atmospheric air is introduced into the chamber through which the material passes last, and the air is then led consecutively through the single chambers lying before the said last chamber. In this manner, the freshly introduced material is exposed to the gas which is poorest in oxygen in the first treating chamber, while in the subsequent chambers the content of oxygen gradually increases until the material in the last treating chamber is exposed to fresh atmospheric air. This has the advantage that the temperature can be accurately regulated so that the heat tone connected with the roasting process does not exceed the maximum permissible limit according to the description hereinbefore given. The regulation of the temperature is of great importance because even at temperatures above 500° C. the molybdic acid formed by the roasting enters into combination with chromic acid and this renders a quantitative working up of the roasted material difficult. The formation of this compound may be detected by a change in colour of the roasted material from grey-green via pale yellow-brown to rose colour. The waste gas leaving the apparatus is practically pure nitrogen which, if necessary after purifying it from carbon dioxide and sulphur dioxide, may be used for any desired purpose. If desired, a portion of it may be added to the fresh air, sucked in by the fan 13, by way of pipe 14. The roasted catalyst is then conveyed into chamber 6, wherein it is cooled. It is then treated at about 80° C. with from 5 to 10 per cent aqueous ammonia in several extraction vessels arranged one behind the other (not shown in the drawing). The fresh material is in the last vessel in which it comes into contact with ammonia water which has already been used in the preceding vessels. The extraction liquid enriched with ammonium molybdate passes from the last vessel to a vaporizer where a part of the ammonia water is evaporated and supplied to the first vessel in which is situated material which has already been extracted to a large extent. It is preferable to cause the ammonia water to flow upwards during the extraction in order to avoid the clogging of the plate or filter supporting the material to be extracted which it is not always possible to avoid when the aqueous ammonia flows downwards. At the end, chromium oxide, in some cases together with other substances which have been added to the catalyst, such as kaolin, alumina and the like remains on the plate or filter while the molybdenum is dissolved quantitatively in the form of ammonium molybdate. This solution is then worked up into solid ammonium molybdate or molybdic acid in any known or suitable manner.

Example 2

50 kilograms of a catalytic mass containing molybdic acid and zinc oxide in molecular proportions is roasted at 480° C. as described in Example 1 and then treated at 90° C. with 100 litres of 12 per cent hydrochloric acid in a stirring vessel. 20 litres of 25 per cent nitric acid are then allowed to flow slowly into this liquid in order to avoid any contamination of the undissolved molybdic acid by lower oxides of molybdenum. The mixture is then boiled at 110° C. until all of the zinc has passed into solution. The molybdic acid is then freed from the zinc solution in a centrifuge. If necessary, the molybdic acid may be further purified, for example by dissolving in ammonia and precipitation with hydrochloric acid.

Example 3

A catalyst containing molecular proportions of molybdic acid and zinc oxide and 20 per cent of magnesium oxide is carefully roasted at from 490° to 500° C. in the manner described in Example 1 and subjected to extraction with from 5 to 10 per cent ammonia water as described in Example 1. Hydrochloric acid is then added at 90° C. to the resulting ammoniacal solution which in addition to molybdenum contains almost the whole of the zinc oxide and a small part of the magnesium by reason of a kind of peptization. The amount of hydrochloric acid is selected so that a quantitative precipitation of the molybdic acid is effected and so that the magnesium and zinc pass into solution. Care should be taken that the liquid has such a hydrogen ion concentration that the resulting precipitate contains no zinc molybdate and on the other hand the hydrogen ion concentration should not be so high that molybdic acid passes into solution again, which can be detected by a deepening in the shade of colour. When the necessary amount of hydrochloric acid has been added, the solution is kept at 90° C. for a further 1 to 2 hours and then cooled to 20° C. The molybdic acid is then separated by centrifuging or filtering by suction. It may be washed with 1 per cent hydrochloric acid or 3 per cent ammonium chloride solution.

What we claim is:—

1. A process for the recovery of molybdic acid from a mixture comprising molybdenum and another metal which comprises roasting the said mixture by treatment with a gas comprising oxygen at a temperature not exceeding 600° C., treating the roasted mixture containing the molybdenum in the form of its oxides with aqueous ammonia, the molybdenum oxides thereby being dissolved with the formation of ammonium molybdate, and then precipitating from the said solution molybdic acid by the addition of an acid agent.

2. A process for the recovery of molybdic acid from a mixture comprising molybdenum and another metal which comprises roasting the said mixture by treatment with a gas comprising oxygen of which the content in oxygen is first small and then gradually increases, at a temperature not exceeding 600° C., treating the roasted mixture containing the molybdenum in the form of its oxides with aqueous ammonia, the molybdenum oxides thereby being dissolved with the formation of ammonium molybdate, and then precipitating from the said solution molybdic acid by the addition of an acid agent.

3. A process for the recovery of molybdic acid from a mixture comprising molybdenum and another metal which comprises roasting the said mixture by treatment with a gas comprising oxygen at a temperature between 400° and 600° C., treating the roasted mixture containing the molybdenum in the form of its oxides with aqueous ammonia, the molybdenum oxides thereby being dissolved with the formation of ammonium molybdate, and then precipitating from the said solution molybdic acid by the addition of an acid agent.

4. A process for the recovery of molybdic acid from a mixture comprising molybdenum and another metal which comprises roasting the said mixture by treatment with a gas comprising oxygen at a temperature between 400° and 500° C., treating the roasted mixture containing the molybdenum in the form of its oxides with aqueous ammonia, the molybdenum oxides thereby being dissolved with the formation of ammonium molybdate, and then precipitating from the said solution molybdic acid by the addition of an acid agent.

5. A process for the recovery of molybdic acid from a mixture comprising molybdenum and another metal which comprises roasting the said mixture by treatment with a gas comprising oxygen at a temperature between 400° and 600° C., treating the roasted mixture containing the molybdenum in the form of its oxides with aqueous ammonia, the molybdenum oxides thereby being dissolved with the formation of ammonium molybdate, and then precipitating from the said solution molybdic acid by the addition of hydrochloric acid.

KARL WINKLER.
WALTER KROENIG.